United States Patent [19]

Hinrichsen et al.

[11] Patent Number: 5,888,580
[45] Date of Patent: Mar. 30, 1999

[54] PRODUCTION OF COMPOSITES FROM POLYMER POWDER DISPERSIONS

[75] Inventors: Georg Hinrichsen; Albert Vodermayer; Karl-Heinz Reichert; Lothar Kuhnert, all of Berlin; Wolfgang Lindner, Dormagen; Gerd Goldmann, Krefeld, all of Germany

[73] Assignee: Hoechst Aktiengesellschaft, Frankfurt, Germany

[21] Appl. No.: 956,930

[22] Filed: Oct. 23, 1997

Related U.S. Application Data

[63] Continuation of Ser. No. 456,376, Jun. 1, 1995, abandoned, which is a continuation of Ser. No. 162,057, filed as PCT/EP92/01395 Jun. 22, 1992, abandoned.

[30] Foreign Application Priority Data

Jul. 3, 1991 [DE] Germany .......................... 41 21 915.5

[51] Int. Cl.$^6$ ....................................................... B05D 5/12
[52] U.S. Cl. ................... 427/8; 427/9; 427/195; 427/434.2; 427/434.6; 264/136; 156/166; 156/180
[58] Field of Search ................. 427/195, 434.2, 427/434.5, 434.6, 8, 9; 264/136; 156/166, 180

[56] References Cited

U.S. PATENT DOCUMENTS

| 3,933,545 | 1/1976 | Wilkinson et al. . |
| 4,058,581 | 11/1977 | Park ......................................... 264/136 |
| 4,626,306 | 12/1986 | Chabrier et al. . |
| 4,680,224 | 7/1987 | O'Connor . |

FOREIGN PATENT DOCUMENTS

| 0 206 134 | 12/1986 | European Pat. Off. . |
| WO 88/03468 | 5/1988 | WIPO . |

OTHER PUBLICATIONS

Gehrig, Heinz, "Continuous Manufacture of Semifinished Products From Fiber–Reinforced Plastics", 38–*Plastics Fabr., Uses* 106:47 (1987), No Month Available.

*Primary Examiner*—Brain K. Talbot
*Attorney, Agent, or Firm*—Frommer Lawrence & Haug LLP

[57] ABSTRACT

Continuous process for producing unidirectionally reinforced composite materials by impregnating a continuous reinforcing fiber strand with a thermoplastic matrix in an impregnating bath containing a dispersion of a thermoplastic powder by measuring the width of the strand leaving the impregnating bath and using this measured value for regulating the polymer concentration in the impregnating bath.

23 Claims, No Drawings

PRODUCTION OF COMPOSITES FROM POLYMER POWDER DISPERSIONS

This application is a continuation of application Ser. No. 08/456,376 filed Jun. 1, 1995 abandoned, which is a continuation of prior application Ser. No. 08/162,057, filed as PCT/EP92/01395 Jun. 22, 1992, (abandoned).

The invention relates to a continuous process for producing unidirectionally reinforced composites by impregnating a continuous reinforcing fiber strand with a thermoplastic matrix using a thermoplastic powder dispersion.

Such processes are known in principle. Generally the thermoplastic powder is applied to the fiber strand moving in longitudinal direction through the powder dispersion, the dispersing medium is removed from this fiber strand, for example by heating, then the thermoplastic is melted and the composite is consolidated, for example by rolling.

In the known processes the deposition of a constant amount of powder on the fiber strand passing through the dispersion bath presents great difficulties since for this to be achieved on the one hand the solids content in the powder dispersion and on the other the amount of powder entrained by the fiber strand have to be kept constant. When the concentration varies in the immediate vicinity of the strand and does not always correspond exactly to the average concentration of the subsequently fed dispersion, the amount of thermoplastic in the end product will vary too.

However, variations in the amount of thermoplastic make themselves very unfavorably felt in the end product, since their fiber content and the exact dimensions of the composites produced are influenced thereby.

In U.S. Pat. No. 4,626,306, for example, the amount of thermoplastic is set using an aqueous polymer powder dispersion by guiding the powder-loaded fiber strand leaving the dispersion bath through a roll nip in order that excess polymer powder may be squeezed out from the fiber strand together with dispersing medium. With this method there is a danger of damaging the highly sensitive reinforcing fibers, in particular in the case of carbon fibers; what is more, broken filaments which are in the course of being formed or are already present in the strand can adhere to the rotating rolls and become wrapped around the latter, which gives rise to problems with the calibration of the amount of thermoplastic and with the entire process. The effect of changes in the polymer concentration of the bath is not even considered.

In the process of U.S. Pat. No. 4,680,224, the fiber strand, after powder loading in a dispersion bath, is calibrated in a heated die. Since such a calibration is known from experience to tend to lead to thread snaps, in particular in the case of fiber contents above 45% by volume, only take-off speeds of at most 30.5 cm/min could be achieved.

A further technical problem with the prior art processes is the local stabilization of the polymer concentration in the bath. This is because a constant thermoplastic content of the exiting strand is ensured only when the fiber strand always passes in the bath through a suspension having the same local particle content. Time-dependent sedimentation or swirling effects bring about differences in the thermoplastic content of the strand, which generally passes through the bath with a relatively high speed and hence short residence time.

The prior art processes achieve an at least partially improved local uniformization of the suspension concentration through the addition of major quantities of dispersants and thickeners. For instance, in the extreme case of the process of WO 88/03468 the viscosity of an aqueous dispersion is increased to values of at least 50 Pas by additions. However, the higher the proportion of dispersants and other foreign substances, the higher too their basically undesirable and disadvantageous presence in the end product. In the case of reinforcement with glass fibers, for example, substances that contain hydrophilic groups are, because of the likewise hydrophilic surface of the glass, preferentially deposited in the interface between the fiber and matrix. This creates the danger, inter alia, of an impairment of the mechanical properties. In particular, this can be brought about by water molecules migrating toward the hydrophilic groups in the interface. Similarly, thermal damage can occur even at below the heat distortion resistance at temperature of the plastics used.

At higher bath viscosities the suspension finds it more difficult to flow through the fiber strand, which consists of a multiplicity of filaments, so that the uniform deposition of the powder particles between the individual filaments requires more effort. For example, if deflecting pins are used in the impregnating bath, the angles of deflection and take-off forces increase, which leads to a reduction in the possible production speeds and to an increase in the fiber damage.

The process of the invention avoids these disadvantages or reduces them decisively.

This process is capable of producing unidirectionally reinforced composites having high tensile strengths and high constancy of thermoplastic content, i.e. having a substantially constant fiber content and substantially constant dimensions, from a thermoplastic powder dispersion by determining the thermoplastic content of the fiber strand emerging from the dispersion bath from the width of the said strand and using this measured value to regulate the solids content of the dispersion bath.

This is based on the discovery that the width of the fiber strand emerging from the dispersion bath depends in a definite manner on the fiber strand's content of thermoplastic powder, given a constant average particle size of the thermoplastic powder.

There has accordingly been found a way of measuring the local polymer concentration in the dispersion bath in the region of the moving fiber strand, since for a constant take-off speed the width of the fiber strand, as explained above, depends on the fiber strand's content of thermoplastic powder and that in turn depends on the local polymer concentration.

Given steady-state concentration conditions in the bath, empirically there is in fact a definite dependence of the fiber strand width on the gross concentration of the dispersion bath (confirmed experimentally in a short-time run). Over wide regions this function is even linear.

Accordingly, the measured value of the width of the fiber strand emerging from the dispersion bath is suitable for setting the thermoplastic content in the end product. If this band width is kept constant in time, the thermoplastic content of the composite will be constant too. The manipulated variable for this is the gross polymer concentration of the bath, a change in which also changes the local powder concentration in the region of the fiber strand.

The polymer concentration is preferably regulated by addition of dispersions having different polymer concentrations. Preference is given to using, for this purpose, three dispersions having different concentrations, the middle one of which is set to the expectation value of the concentration in the exiting strand. The quantities added can be set by a level controller of the bath.

The width of the fiber strand can preferably be measured in the local context using one or more deflecting pins which spread out the strand at least to a small extent. The measurement itself can be carried out in various ways.

Preference is given to contactless methods of measurement, for example optical or laser-optical methods.

The dispersing medium used is preferably water. However, it is also possible to use other substances, in particular organic solvents. The concentration of the dispersion is set to 30–300 g/l of dispersing medium, preferably 50–150 g/l of dispersing medium.

The process of the invention does not require a completely homogeneously mixed dispersion bath, since the strand width is a measure of the local polymer concentration at the location at which the strand is coated with polymer powder.

For this reason it is possible to operate with very low viscosities of the dispersion. The viscosity is at most 50 mPas., preferably at most 10 mPas, particularly preferably it is below 4 mPas. Therefore there is a complete absence of assistants solely for increasing the viscosity of the dispersion.

That is why it is also possible to keep the amount of dispersing assistants small, i.e. below 0.3% by weight, preferably below 0.15% by weight, based on the ready-prepared dispersion.

Suitable dispersing assistants are in particular nonionic surface-active substances as prepared by ethoxylation of fatty alcohols, fatty acids, glycerol fatty acid esters, alkylglycosides, alkylphenols, polypropylene glycols, alkylamines or fatty acid amides. Also suitable are nonionic surfactants based on silicon or having perfluoroalkyl chains.

The particles are additionally kept in suspension by agitation of the dispersion bath, preferably by stirring, recirculating with a pump or passing a gas stream through the bath.

The fiber strand can preferably be guided in the dispersion bath over fixed deflectors, which are preferably constructed as cylinders having radii between 2 and 120 mm. However, any other configuration of the shell surfaces is possible, for example with cone-, sphere-, parabolid-, hyperboloid-shaped surface elements or surface elements curved according to any desired function.

If cylindrical deflectors are used, preference is given to using 2 to 10 pins. The total turn-angle of the strand taken over the sum of the pins can be relatively small. It is below 480°, preferably below 270°, particularly preferably below 170°.

The process operates with low take-off forces and is very gentle on the fiber. For this reason it makes possible high production speeds of up to 100 m/min, but at least 8 m/min, preferably at least 15 m/min, particularly preferably at least 25 m/min. In practice, the speed set depends essentially on the nature of the reinforcing fiber. Relatively brittle fibers, such as HM carbon fibers, are distinctly more difficult to process than, for example, aramid fibers.

The thermoplastic powder can consist of any commercially available or else modified thermoplastic.

The powder must have a lower softening or melting point than the material of which the reinforcing fibers are made. Suitable are for example thermoplastics in the widest sense, i.e. substances which behave thermoplastically, reversibly or transiently. Examples of thermoplastics are polyolefins, vinyl polymers such as polyvinyl halides, polyvinyl esters, polyvinyl ethers, polyacrylates and polymethacrylates, organic cellulose esters, and also polyamides, polyurethanes, polyureas, polyimides, polyesters, polyethers, polystyrenes, polyhydantoins, polyphenylene oxides, polyarylene sulfides, polysulfones, polycarbonates, compounds having polymerization- and/or polyaddition-capable double bonds, polyimide precursors, polyether ketones, polyether ether ketones, polyether sulfones, polyether imides, polyamide imides, polyfluoroalkenes, polyester carbonates and liquid crystal polymers, also apolar thermoplastic polymers (such as polyolefins) grafted with polar groups.

Preferred thermoplastics are polyethylenes, polypropylenes, polybutylenes, polypentenes, polyvinyl chlorides, polymethyl methacrylates, polyacrylonitriles, polymethacrylonitriles, polystyrene-containing multiphase plastics such as ABS, polyamides of type 6, polyamides of type 6—6, polyamides of type 12, polyethylene terephthalates, bisphenol A polycarbonates, polyphenylene sulfides, polyether ketones, polyether ether ketones, polyether sulfones, polysulfones, polyether imides, polyamide imides, polyester carbonates and liquid crystal polymers, and also polypropylene grafted with polar groups.

The thermoplastics can also be present in a wide range of combinations, for example as alternating copolymers, block copolymers, graft polymers, random copolymers and polyblends.

The usable particle sizes of the powder are below 350 $\mu$m, preferably below 100 $\mu$m, particularly preferably below 20 $\mu$m.

The chemical constitution of the reinforcing fibers can differ widely. They can also consist of thermoplastic material. The only essential criterion is that the reinforcing fibers have a higher softening or melting point than the respective thermoplastic matrix, so that they remain behind as a solid structure after the thermoplastic matrix has been melted. Examples of fiber materials are inorganic materials such as silicatic and non-silicatic glasses of various kinds, carbon, boron, silicon carbide, metals, metal alloys, metal oxides, metal nitrides, metal carbides and silicates and also organic materials such as natural and synthetic polymers, for example polyacrylonitriles, polyesters, ultrahighly drawn polyolefin fibers, polyamides, polyimides, aramids, liquid crystal polymers, polyphenylene sulfides, polyether ketones, polyether ether ketones, polyether imides, cotton and cellulose. Preference is given to high-melting materials, for example glasses, carbon, aramids, liquid crystal polymers and polyphenylene sulfide, polyether ketones, polyether ether ketones, polyether imides.

The fiber content of the composites is 20 to 75% by volume, preferably 45 to 65% by volume.

Measurements show that the transitory variations in the thermoplastic content of the composite produced are indeed very small. Variations are below 3%, preferably below 2%, particularly preferably below 1.5% of the thermoplastic volume present in the composite. For a composite having a fiber content of 60% by volume the resulting tolerance in the fiber content is accordingly 1.2% by volume, preferably 0.8% by volume, particularly preferably 0.6% by volume. Tolerances in the dimensions of the composite are correspondingly small.

The composites produced have high tensile strength. If glass fibers, aramid fibers and HT carbon fibers are used, 85%, preferably 90%, particularly preferably 95%, of the theoretical tensile strengths are achieved. These theoretical values are the pure fiber strengths calculated according to information provided by the fiber manufacturer without regard to the comparatively low strength of the matrix.

EXAMPLE 1

A carbon fiber roving with 12,000 filaments (12K) of the type Celion HTA 7C G30-500 is pulled at a rate of 2.9 m/min through an aqueous powder dispersion of polyphenylene sulfide (PPS) powder. The powder has an average particle size of 20 μm. Dispersion is assisted with the nonionic surfactant "Cremophor" A 25 (BASF), which is added in a concentration of 2 g/l of water.

The fiber strand is guided in the dispersion over 5 pins, the sum of the turn angles of the fiber strand around the pins being 128°.

It is found that the roving width at the point of exit depends definitely on the fiber content of the roving and that this fiber content in turn depends definitely on the powder content of the dispersion. The detailed measurements are:

| Roving width mm | Fiber content of roving % by volume | Powder content of dispersion g/l |
|---|---|---|
| 8.2 | 57.3 | 100 |
| 10.2 | 50.2 | 125 |
| 11.4 | 45.5 | 150 |
| 12.2 | 40.3 | 175 |
| 14.1 | 34.4 | 200 |

EXAMPLE 2

Using the same materials and the identical constructional composition of the dispersion bath as in Example 1, the speed of the roving is varied while the powder content of the dispersion is kept at a constant 100 g/l and the surfactant content is kept at a constant 1 g/l. The fiber content of the roving, and hence the roving width, depends definitely on the speed of the strand. The following measurements are obtained:

EXAMPLE 3

| Speed m/min | Fiber content of roving % by volume | Roving width mm |
|---|---|---|
| 0.5 | 41.7 | 12.9 |
| 1.0 | 49.5 | 11.1 |
| 1.5 | 53.3 | 10.2 |
| 2.0 | 55.2 | 9.4 |
| 2.9 | 57.5 | 8.3 |

Using the same materials and the identical constructional composition of the dispersion bath as in Example 1, the speed of the roving is increased to 19 m/min. The powder content of the dispersion is 130 g/l, the surfactant content is 1.3 g/l. The emerging roving has a width of 7.1 mm and a fiber content of 68% by volume.

EXAMPLE 4

Under otherwise identical conditions as in Example 3, a roving of aramid fiber (Twaron HM 1056, 805 tex, manufacturer: Akzo) is pulled through the dispersion at a speed of 3 m/min. The particle size is 22 μm, the powder concentration is 100 g/l. The emerging roving has a width of 6.2 mm and a fiber content of 58% by volume.

EXAMPLE 5

The dispersion bath of Example 1 is integrated into an overall process. The same materials are used. The dispersion is made up by adding 95 g of PPS powder and 0.9 g of Cremophor per 1000 g of water. The dispersion produced has a low viscosity of 2 mPas.

A 12K roving is continuously pulled off the bobbin through the dispersion bath at a speed of 3.5 m/min and, after the width measurement, first dried in a tubular hot-air oven 1.6 m in length by a counter-current hot-air stream. The oven temperature is 330° C. at the point of entry, 400° C. in the center and 370° C. at the point of exit.

In a subsequent second oven the polymer powder is completely melted. This radiation oven has a length of 0.6 m and a temperature of 370° C. In the next step the hot strand is consolidated and cooled down in the roll nip of a contour roll made of steel and temperature-controlled to 80° C. The roll nip force is 58N. Downstream of the roll is the take-off system, which pulls the strand through the entire installation.

The unidirectionally reinforced composite produced has a fiber content of 59% by volume. The tensile strength is 2120 mPa. Given that the manufacturer's quoted tensile strength of the reinforcing fiber is 3792 mPa, the tensile strength achieved is accordingly 94.8% of the theoretical. The volume variations are below 1.2%, based on the thermoplastic volume in the composite material, or below 0.5%, based on the composite as a whole.

We claim:

1. An improved process for producing a unidirectionally reinforced composite having a substantially constant thermoplastic content in which a fiber strand is moved in the longitudinal direction through at least one dispersion bath including thermoplastic powder and a dispersing medium, to create an impregnated fiber strand, the improvement comprising:
   measuring the width of the impregnated fiber strand emerging from the dispersion bath; and
   using said width measurement to determine the thermoplastic content of the impregnated fiber strand using said width measurement to regulate the content of thermoplastic powder present in the dispersion bath.

2. The process according to claim 1, wherein the dispersion has a viscosity of at most 50 mPas.

3. The process according to claim 1, characterized in that at most 0.3% (by weight) of a dispersing assistant is added to the dispersion.

4. The process according to claim 1, characterized in that the speed of the moving fiber strand through the impregnation bath is above 8 m/min.

5. The process according to claim 1, characterized in that the thermoplastic powder content of the composites produced varies in time by at most 3%.

6. The process according to claim 1, characterized in that the composites produced have tensile strengths which, if glass fibers, aramid fibers and carbon fibers are used, are above 85% of the tensile strength calculated by the rule of mixtures.

7. The process according to claim 1, characterized in that at most 0.3% (by weight) of a dispersing assistant is added to the dispersion.

8. The process according to claim 1, characterized in that the speed of the moving fiber strand through the impregnation bath is above 8 m/min.

9. The process according to claim 1, characterized in that the thermoplastic content of the composite produced varies in time by at most 3%.

10. The process according to claim 1, characterized in that the composite produced have tensile strengths which, if glass fibers, aramid fibers and carbon fibers are used, are above 85% of the tensile strength calculated by the rule of mixtures.

11. The process according to claim 1, wherein said thermoplastic powder has an average particle size less than about 350 microns.

12. The process according to claim 1, wherein said thermoplastic powder has an average particle size less than about 350 microns.

13. The process according to claim 1, wherein said thermoplastic powder has an average particle size less than about 100 microns.

14. The process according to claim 1, wherein said thermoplastic powder has an average particle size less than about 100 microns.

15. The process as claimed in claim 1, characterized in that the speed of the moving fiber strand through the impregnation bath is above 25 m/min.

16. The process as claimed in claim 1, characterized in that the speed of the moving fiber strand through the impregnation bath is above 25 m/min.

17. The process as claimed in claim 1, wherein the dispersing medium is water.

18. The process as claimed in claim 1, wherein the dispersing medium is water.

19. The process as claimed in claim 1, wherein said dispersion has a concentration of thermoplastic powder to dispersing medium ranging from 30–300 g/l.

20. An improved process for producing a unidirectionally reinforced composite having a substantially constant thermoplastic content in which a fiber strand is moved in the longitudinal direction through at least one dispersion bath including thermoplastic powder and a dispersing medium, to create an impregnated fiber strand, the improvement comprising:

measuring the width of the impregnated fiber strand emerging from the dispersion bath;

using said width measurement to determine the thermoplastic content of the impregnated fiber strand; and using said width measurement to adjust the content of thermoplastic powder in the bath to make it constant.

21. The process as claimed in claim 1 further comprising adjusting the polymer concentration in the bath by adding to the bath from at least one of three dispersions each having a different concentration.

22. The process as claimed in claim 21 wherein the three dispersions have a first, second and third concentration and the second concentration is set to the expected value of the concentration in the exiting strand.

23. The process of claim 1, wherein the width of the fiber strand emerging from the dispersion bath is used to regulate the polymer content of the dispersion bath.

* * * * *